United States Patent [19]
Ahlen

[11] 3,940,947
[45] Mar. 2, 1976

[54] RESILIENT DRIVING CONNECTIONS
[75] Inventor: Karl Gustav Ahlen, Stockholm, Sweden
[73] Assignee: S.R.M. Hydromekanik Aktiebolag, Sweden
[22] Filed: Sept. 9, 1974
[21] Appl. No.: 504,235

Related U.S. Application Data
[63] Continuation-in-part of Ser. No. 367,376, June 6, 1974, abandoned.

[30] Foreign Application Priority Data
June 26, 1972 United Kingdom .............. 29919/72

[52] U.S. Cl. .................. 64/14; 64/10; 64/11 R; 64/27 NM; 64/15 R
[51] Int. Cl.² .......................................... F16D 3/64
[58] Field of Search ...... 64/11 R, 10 R, 14 R, 15 R, 64/27 R, 27 NM

[56] References Cited
UNITED STATES PATENTS

| | | | |
|---|---|---|---|
| 2,301,660 | 11/1942 | Ricefield | 64/14 |
| 2,446,942 | 8/1948 | McFarland | 64/14 |
| 2,958,213 | 11/1960 | Donner | 64/15 P |
| 3,314,512 | 11/1967 | Kerestury | 64/14 |
| 3,788,151 | 1/1974 | Campav | 64/14 |
| 3,813,898 | 6/1974 | Hatch | 64/15 R |

FOREIGN PATENTS OR APPLICATIONS
1,958,129  11/1969  Germany .............. 64/14

*Primary Examiner*—Samuel Scott
*Assistant Examiner*—Randall Heald
*Attorney, Agent, or Firm*—Larson, Taylor and Hinds

[57] ABSTRACT

A rotatable driving connection in which a plurality of abutments on one rotating part engage corresponding generally radial slots on the other rotating part with resilient material between each abutment and the contacting surfaces of its respective slot. The abutments are arranged in pairs of groups, the resultant of the forces of one group being perpendicular to the resultant of the other group. A leaf spring may be associated with each abutment to maintain contact between the resilient material and the walls of the slot and to prevent backlash. The area of contact between the resilient material and the walls of the slot varies in relation to the force transmitted by the connection.

27 Claims, 11 Drawing Figures

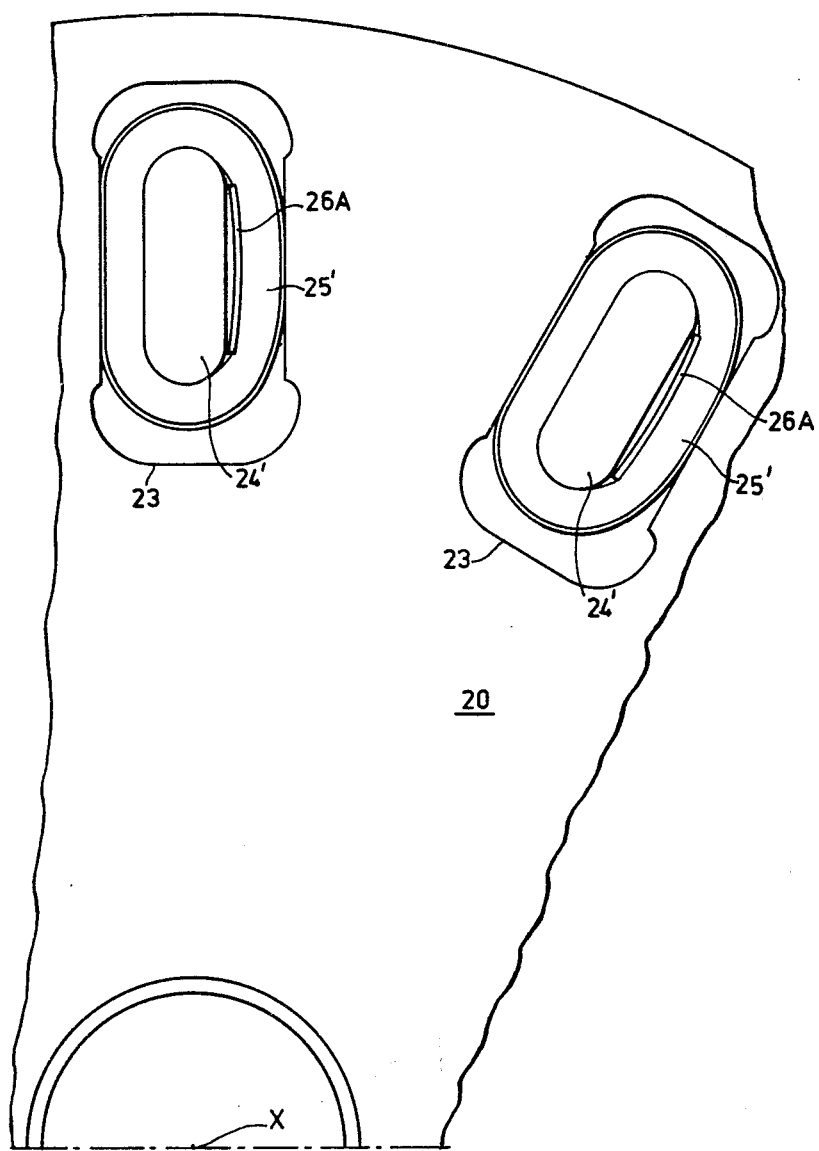

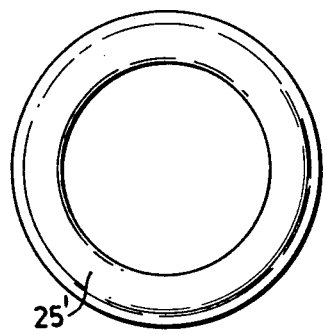
FIG. 7   25'
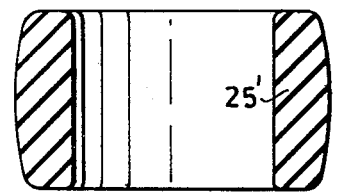
FIG. 8
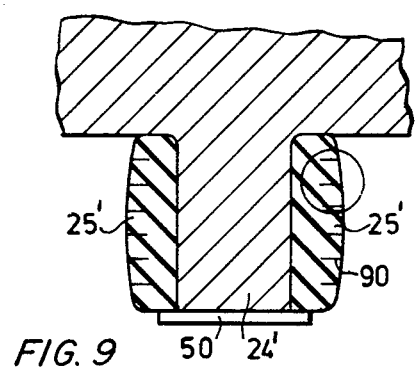
FIG. 9
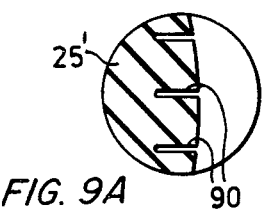
FIG. 9A

RESILIENT DRIVING CONNECTIONS

RELATED APPLICATION

This application is a continuation-in-part of my copending application, Ser. No. 367,376, filed June 6, 1974, now abandoned.

BACKGROUND OF THE INVENTION

This invention relates to a driving connection for use between an internal combustion engine and for instance, a rotating casing of a torque converter and having an intermediate part of resilient or flexible material for transmitting drive.

The main operational requirements for such connections are that they sould be capable of accepting a certain degree of misalignment and allow a certain degree of axial movement between the connected parts. At the same time the resilience should be such that the connected parts rotate at speeds below the critical speed the whole time, or in some cases, at speeds between the critical speed ranges.

Many types of resilient driving connections are known and, in some of these, the resilience is varied for the transmission of different torques, allowing a critical speed to be exceeded or permitting operation in the critical speed ranges.

In general, known driving connections are expensive and fulfil the requirements to a greater or lesser extent in one respect or another. Such connections include star plates and different kinds of waved discs permitting very high critical speeds to be achieved. Soft rubber elements with a high damping capacity are also used between driving and driven parts in a drive-line fitted with a hydraulic drive.

SUMMARY OF THE PRESENT INVENTION

It is a purpose of the present invention to form a resilient coupling of the type having resilient material between driving and driven parts, having a low resilience and a resilience varying in different driving directions and for transmission of different torques in such a way that it would be possible, not only to drive partly through critical speed ranges but, also, due to the kind of variation of the resilience, to drive partly in critical speed ranges for different torques.

It is another purpose of the invention to form a coupling which would readily permit modification of the resilience in both directions of driving to adapt the coupling, without and major structural variations, for different operational requirements. Also, of course, the coupling should be capable of accepting misalignment between the connected parts to the degree required for the type of application and allow independent axial journalling of shafts associated with the coupling such as, for instance, the engine crankshaft and the rotating casing of the torque converter with their expansion and axial movements. It is also desirable that the coupling should permit easy mounting by sliding one part into another.

In addition to the disadvantages previously mentioned, other disadvantages of known connections are that centering depends on the journalling surfaces of the connected parts as well as the fact that they normally permit a certain amount of backlash. In the latter case it is, therefore, difficult to avoid overlaod tendencies with an attendant increase in torsional oscillating energy in all driving conditions. The present invention, therefore, also seeks to overcome these disadvantages and provide a resilient driving connection which is self-centering and in principle is independant of separate journalling surfaces. The present invention further seeks to eliminate backlash and provide a resilient element possessing a suitable variation in the relationship between deflection and force so as to reduce torsional movement energy overload tendencies by varying the theoretically critical speed in relation to the torsional load.

These purposes of the present invention are satisfied in accordance with the invention by providing a resilient driving connection which includes generally radial slots or apertures in either a rotatably mounted driving or driven part, in which slots or apertures abutments from the other part are located. These abutments are either coated with a resilient material or carry a sleeve of such material of suitable thickness. The connection between the driving and the driven parts is obtained through pairs of groups of surfaces, the direction of the resultant forces acting on one group of pairs being perpendicular to the resultant of the forces acting on the other group of pairs. In a preferred arrangement the two groups comprise double pairs of diametrically opposed surfaces parallel to a plane through the axis of rotation, in which a multiple of such opposed pairs of surfaces substantially at right angles to each other serve to center the driving and the drive parts and the driving force between the parts is transmitted via the resilient material. Leaf springs may be inserted between the abutment and the resilient material or vulcanized into the resilient material.

According to one aspect of the invention there is provided a resilient driving connection for use between a driving part and a driven part each part including a plurality of groups of circumferentially spaced driving contact surfaces and each group including a pair of contact surfaces on each part with one surface of each pair formed on the respective parts and with the surfaces on each pair located in radial planes or planes substantially parallel to radial planes passing through the axis of rotation of the parts and a resilient member disposed between each pair of driving contact surfaces and constituting a direct connection therebetween.

It will therefore be appreciated that the requirements of the invention are fulfilled by a structure according to the invention in that the torque between the two rotating parts is carried over by torque transmitting surfaces, which are parallel to radial planes passing through the axis of rotation and disposed in groups around a circumference, in which each group has two surfaces in each part to co-operate with two surfaces on the other part and that between these surfaces is a resilient material formed in such as way that different areas of contact surfaces are obtained for different forces transmitted and that the resilience is, in principle, different in the two driving directions due to the fact that spring elements co-operate with the resilient material in principle on the side normally not taking over torque and, further, that these groups of radial planes are disposed around the circumference not only balancing the forces carried over but also, due to the above mentioned shape, centering the two contact parts.

With the structure in question low or high resilience in a normal driving direction can easily be obtained, as the contact surfaces may be chosen for this requirement.

One important goal of this invention is to provide a coupling of the type having resilient force transmitting material which is suitable not only for driving the rotating casing of a normal torque converter but also for driving a torque converter having a direct drive lock-up clutch which, in certain circumstances must be engaged even at low engine speeds, especially during hydraulic braking. This goal is achieved by reducing and for all practical purposes eliminating backlash by utilizing a spring between the resilient material and one of the said driving contact surfaces of each pair and by the specific form of the resilient material located between the pair of driving surfaces.

BRIEF DESCRIPTION OF THE DRAWINGS

The invention will now be described with reference to the accompanying drawings in which:

FIG. 6 is an end view of FIG. 5, taken in the direction of arrow Z in FIG. 5;

FIGS. 7 and 8 show the resilient element of FIGS. 5 and 6 in plan and section respectively before mounting on its half of the driving connection;

FIG. 9 is a section view showing a variation of FIG. 8;

FIG. 9A is an enlargement of the circled portion of FIG. 9;

DETAILED DESCRIPTION OF THE PREFERRED EMBODIMENTS

Figure 1:
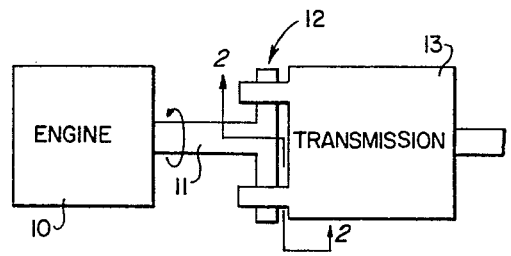
FIG. 1 is a schematic plan view illustrating the application of the present invention to the driving connection between an engine and a transmission.

Referring now to the drawings, like elements are represented by like numerals throughout the several views.

FIG. 1 illustrates schematically the environment of the present invention. An output shaft 11 from an engine 10 such as a diesel engine transmits its torque via driving connection 12 to a transmission 13 which may be a torque converter.

Figure 4:
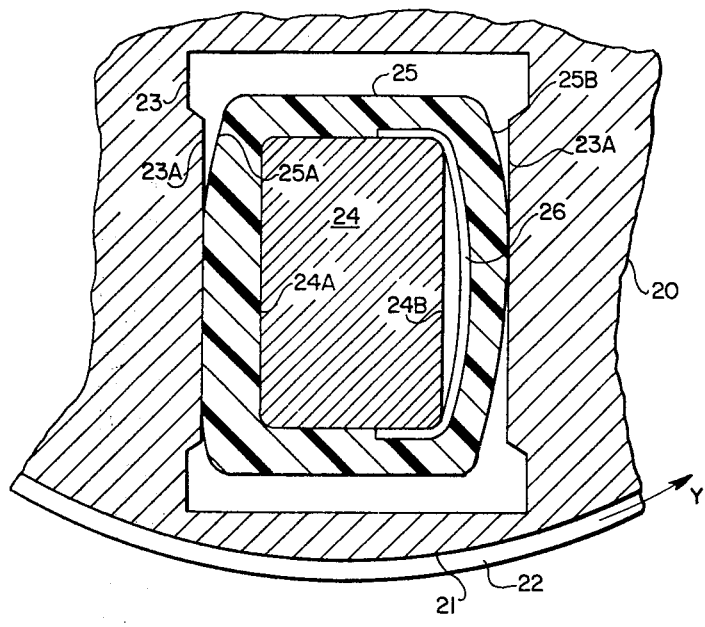
FIG. 4 is an enlarged sectional view taken along line 4—4 of FIG. 2.
Figure 2:
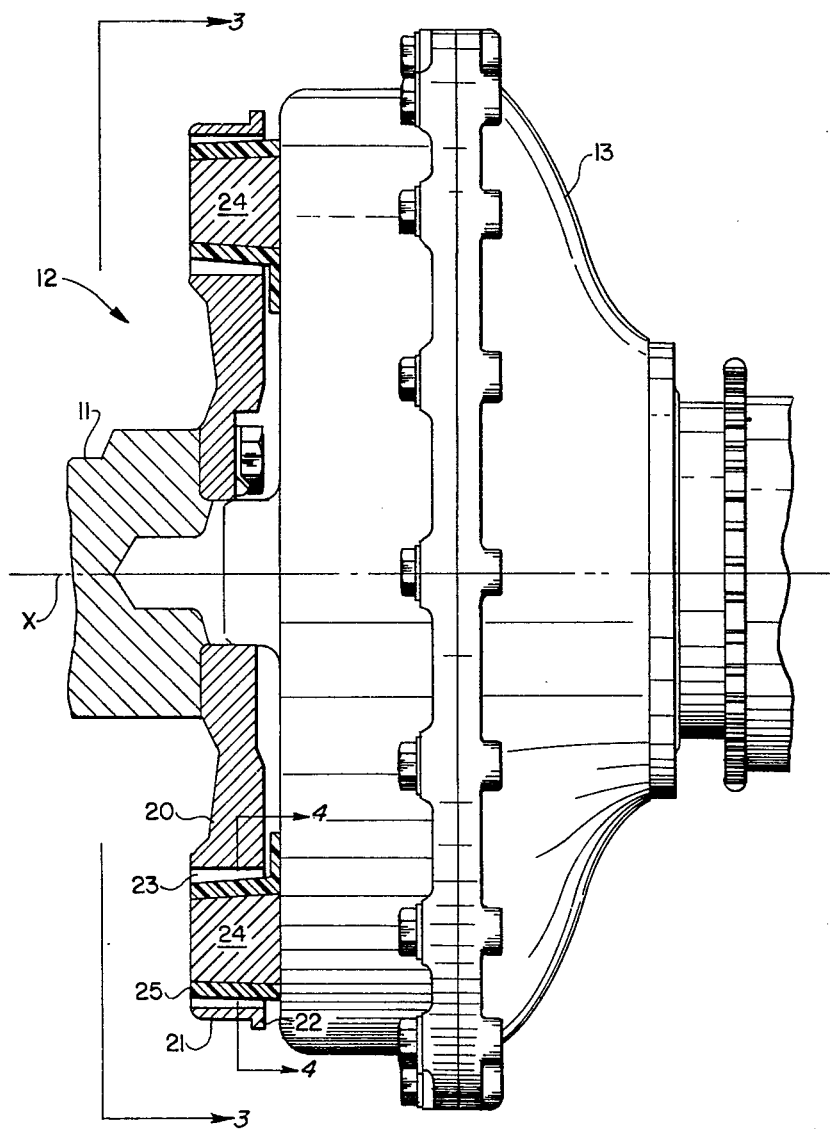
FIG. 2 is a partial sectional and partial side elevational view, taken along line 2—2 of FIG. 1 and showing the present invention applied to the driving connection between an engine flywheel and the rotating casing of a torque converter.
Figure 3:
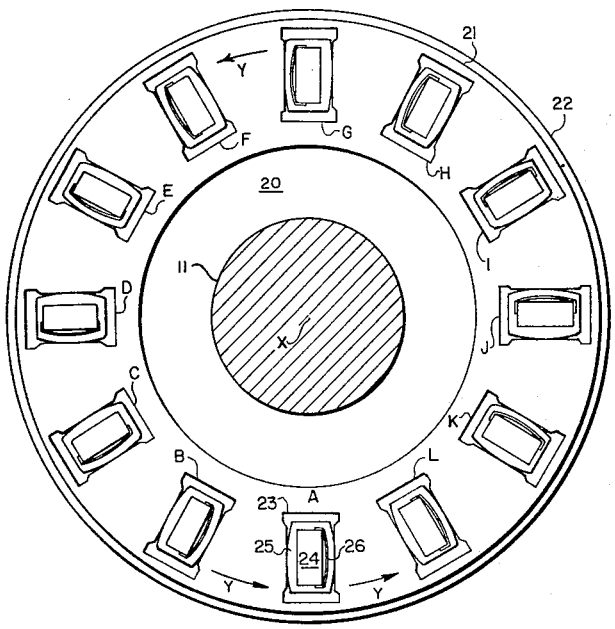
FIG. 3 is a cross-sectional view taken along line 3—3 of FIG. 2.
Figure 5:
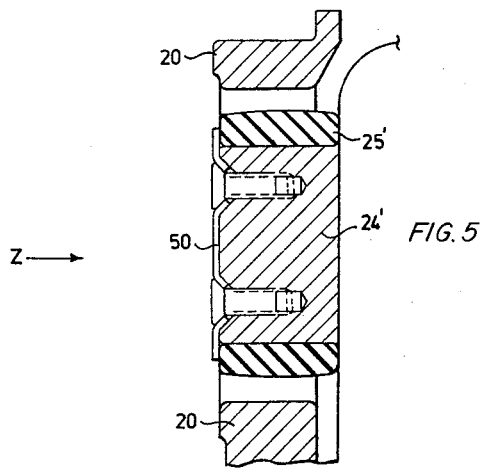
FIG. 5 is view similar to a portion of FIG. 2, showing another form of the invention.

FIGS. 2–4 illustrate a preferred arrangement of the present invention wherein the engine output shaft 11 is drivingly engaged with a torque converter 13.

Referring now to FIGS. 2–4, a flywheel 20 of the engine 10 is formed with a plurality of parallel sided radially extending slots 23. A rotatable casing 13 of a torque converter has a plurality of peripherally spaced abutments 24 extending into the slots 23 in the flywheel and, on each abutment 24, there is a sleeve or coating 25 of a resilient material. For convenience, each abutment and its respective slot may be referred to as a drive unit, wherein each side of the abutment with its facing side of the slot defines opposed surfaces. The abutments 24 are of generally rectangular cross-section and extended in a radial direction with their major surfaces disposed parallel to a plane passing through the axis of rotation X. Each sleeve 25 and its associated abutment 24 has one mutual co-operating plane surface 24A (see FIG. 4) in the driving direction as indicated by the arrow Y in FIG. 3. In addition, the outer surfaces 25A and 25B of the sleeve 12 are slightly convex and lie against plane radially extending surface 23A of the slot 23 in the flywheel so as to vary the area of the load transmitting contact surface relative to the load and to vary the flexure of the sleeve in relation to the load for different loads. On the side 24B of each abutment 24 opposite from side 24A, i.e. in the direction normally transmitting load when the engine is braking, a spring 26 is located between the abutment 24 and the sleeve 25. The spring 26 may have a convex shape in the radial and/or axial direction to assist not only to reduce backlash but also to reduce any tendency for separation to occur between the sleeve 25 and the abutment 24 on the one hand and the radial sides 23A of the slot 23 and the sleeve 25 on the other hand. The spring 26 is actually sufficiently strong to take up the torque carried over in the opposite direction when engine braking is applied without permitting loss of contact in the driving direction between the abutment 24 and the slot 23 via the resilient material. The function of the spring load serves to center the flywheel 20 and the rotating casing 13 as well as to practically eliminate or at least considerably reduce backlash.

The spring 26 is a leaf spring inserted between the resilient member 25 and the abutment 24; alternatively, spring 26 could be a coil spring, or a leaf spring formed directly in the interior of the resilient material.

The driving connection of the invention makes it possible by simply exchanging the spring plate 26 to adapt the driving connection to different combinations of driving conditions of the driving and driven parts. The resilient material from which the sleeve 25 is made is of a type having high hysteresis and at the same time, is capable of resisting high temperatures, for example, certain variants of silicon rubber. Since a coupling of the type in question if often used between engines having a large eccentricity between the flywheel casing and the crankshaft and also having high dynamic "swash" action, it is desirable to provide large contact surfaces in relation to load between the driving surfaces and to allow axial movement between the resilient material and the surface in the slot without wear. This is obtained in the coupling according to the invention by having a relatively large number of slots and abutments and also by making them of relatively large radial extent. This is accomplished in this design without loss of volume. The surfaces of the slots are preferably polished and/or coated with an anti-friction coating in the form of a lacquer or polytretofluoroethylene (Teflon).

The concept of self-centering is accomplished by constructing the abutment-slot connections such that while radial movement between the abutments and the slots is permitted in radial directions because of the radial elongation of the slots currently positioned in that direction, such movement is only allowed without changing the center due to the effect of the slots and abutments in quadrature. This concept will be more clearly explained with reference to Fig. 3 wherein twelve abutment-slot connections have been labeled A through L.

Essentially, the abutment-slot connection can be thought of as being divided into pairs of groups, the resultant force of each group of a pair being perpendicular to the resultant force of the other group of that pair. For example, each group may comprise diametrically opposite connections, one group of the pair constituting connections A and G while the other group of the pair comprises connections D and J. Considering the groups in this manner as pairs of diametrically opposed connections, FIG. 3 illustrates a further group of pairs including connections H and B on the one hand and E and K on the other hand and a third pair of groups including C and I on the one hand and F and L on the other hand. However, it can be seen that there are numerous combinations which will accomplish the same result of having the resultant force of each group of a pair being directed perpendicular to the other. For example, if connections A and G form one group of the pair, the other group of that same pair could include (rather than connections D and J as described above) connections C, K, I, E or connection D, I and K or connections J, E and C, et cetera.

The embodiment of FIGS. 5–9, differs from that of FIGS. 2–4 in certain respects. In FIGS 2, 3 and 4 the resilient sleeves 25 have a surface curvature the axis of which is parallel to the axis of rotation, whereas in FIG. 5 to 9 the axis of the curvature of element 25' is parallel to a radius through the center shaft. Further, in the embodiment of FIGS. 2, 3 and 4 there is the same contact surface between the rubber and the steel, rubbing against each other, whereas according to the variant of FIGS. 5 to 9, the rubber contact line, if sliding due to misalignment or eccentricities, will move axially and cover a surface on the contacting steel part. From a wear standpoint, this variant is more favorable.

Further, to make the coupling in question more capable of functioning for relatively large axial movements during rotation of the coupling between the abutments and the slots in the flywheel, the resilient sleeves 25' are formed with cuts as shown in FIGS. 9 and 9A to produce a number of rubber fingers 90 which take up the tangential force and allow each rubber finger to bend under an axial force applied to the free end of the finger and, in a way, roll with the contact surface without really slipping during an axial movement.

In another version each finger 90 has a radius to simplify this movement. Even if this theoretically would lead to a line contact due to the surface pressure, each finger will have contact practically over its entire end surface, but it will roll more easily and tend to stay in contact with the same steel surface. The slots of FIGS. 9 and 9A may of course be used equally well on the resilient sleeves of FIGS. 2, 3 and 4.

A further difference between the features according to FIGS. 2–4 and 5–9 is that the resilient sleeves 25' according to 5 to 9 may be cast round, which simplifies the manufacture of tools. Another difference is that the resilient sleeves 25' according to 5–9 are fastened as shown on FIG. 5 by means of a steel plate 50 to avoid axial movement of the abutments 24', either of the resilient elements 25' or the spring plate 26A. Also the spring plate 26A may be considered to be bent in the opposite direction to that shown on 2–4 to obtain a longer contact line opposite to the driving side.

Figure 10:
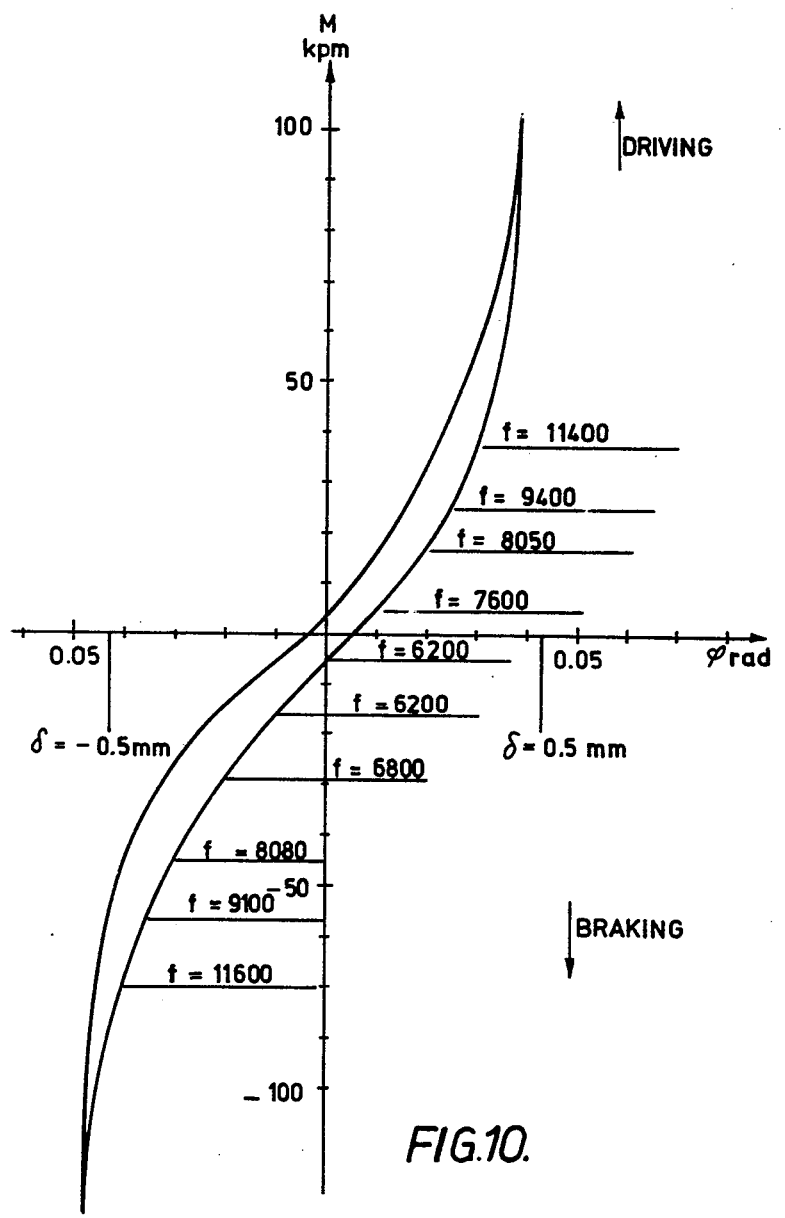
FIG. 10 is a diagram showing the flexibility of one example of a coupling according to the invention.

FIG. 10 shows the torsial flexibility of one example of a coupling according to the invention, utilized between a 70 h.p. 4 cylinder diesel engine and a torque converter transmission for the same, the engine having a top speed of 3200 rpm. The diagram shows on the upside flexibility in normal driving direction and below the center line it shows the flexibility of the coupling when the engine is braking. The two curves show the hysterises of the coupling in a way representing the absorption of energy. As will be seen from the curve the resonance frequency changes with the load and further the frequency is high enough to allow running below critical speed. In the application in question the maximum number of impulses per minute from the engine in question will be 3200/2 × 4 or 6400. This number of impulses will not occur or it will be of little importance at low torque transportation. Therefore, there is a substantial margin to the resonance frequency. The frequences shown on FIG. 10 are calculated from the masses on both sides of the coupling in the application in question and with the flexibility of the coupling at each torque. The coupling in question would therefore be safe even without its quality of varying the frequency with the torque. However, many times, especially for earth moving vehicles, impulses in any frequency can enter from the secondary side. Therefore this feature is always of high value. The coupling is obviously also better than a so-called stiff coupling, because it can eliminate torque peaks, for instance the last moment of synchronizing when connecting direct drive. On FIG. 10 δ is a displacement of the coupling on the radii of the abutments while φ is the angular displacement in radiant. f is the resonance frequency in impulses/ minute and M is the number of Kgm loading the coupling in question being in accordance with the invention and having dimensions suitable for the application in question.

It will be appreciated that by selecting the radial extension and the width of the contact surface and by choosing the correct number of abutments and slots, it is possible to make the coupling sufficiently stiff to retain its other features and to run under critical speed even if this, due to the character of the coupling, is not entirely necessary.

One of the characteristics of the coupling according to the invention is that in spite of the fact that it is self-centering and that it is capable of taking large misalignment and axial movement, it lends itself to be made rotationally stiff and thereby function as rotationally stiff connection.

Although the invention has been described in considerable detail with respect to preferred embodiments thereof, it will be apparent that the invention is capable of numerous modifications and variations apparent to those skilled in the art without departing from the spirit and scope of the invention, as defined in the claims.

I claim:

1. A resilient driving connection rotatably drivingly connecting a driving part and a driven part, comprising:
a plurality of drive units spaced about the axis of rotation of the parts, each unit comprising a drive member rigid with the driving part and a driven member rigid with the driven part, first opposed surfaces on the driving and driven members through which drive normally occurs, second opposed surfaces on the driving and driven members substantially free of driving forces during normal drive, but through which force is transmitted upon braking wherein the driven member drives the driving member, both pairs of opposed surfaces extending in planes which are radial or parallel to radial planes so that the driving and driven members can move radially relative to each other to correct for misalignment between the driving and driven parts, first resilient means interposed between the first opposed surfaces, said first resilient means having means for absorbing energy and becoming stiffer as the driving load increases, such that the resonant frequency thereof increases sufficiently rapidly with increased load that it stays above the actual frequency of vibration of the resilient means during normal operation thereof, and second resilient means interposed between the second opposed surfaces, said second resilient means having a stiffness less than that of the first resilient means so as to permit relative movement of both pairs of opposed surfaces for correcting for misalignment, but sufficiently stiff to maintain contact between the second opposed surfaces during substantially all normal driving conditions.

2. A resilient driving connection according to claim 1, said means for increasing the stiffness of the first resilient means comprising means for increasing the area of contact between one of the first opposed surfaces and said resilient means.

3. A resilient driving connection according to claim 2, each of said first and second resilient means comprising resilient material interposed between their respective opposed surfaces.

4. A driving connection according to claim 3, wherein the surface of the resilient material is convexly curved about an axis parallel to the axis of rotation of the driving and driven parts.

5. A driving connection according to claim 3, wherein the resilient material is convexly curved about an axis generally perpendicular to the axis of rotation.

6. A driving connection according to claim 2, said means for increasing the contact area of the first resilient means of comprising the construction wherein said one surface of the first resilient means is convexly curved, whereby the resilience of the resilient means and the convex shape cause the resilient means to tend to flatten so as to increase the said contact area upon an increase in the force transmitted across the first opposed surfaces.

7. A driving connection according to claim 6, said one surface of the resilient means being curved about an axis generally parallel to the axis of rotation of the driving and driven parts.

8. A driving connection according to claim 6, said one surface of the first resilient means curved about an axis generally perpendicular to the said axis of rotation.

9. A driving connection according to claim 3, said resilient material being formed with a plurality of cuts into the surface thereof extending generally perpendicular to the said one surface so as to allow movement between the said one surface and that opposed surface which it abuts with reduced force and wear.

10. A driving connection according to claim 9, wherein the portions of said one surface of the resilient material between the cuts are formed to roll on the said abutting opposed surface when the resilient material is flexed.

11. A driving connection according to claim 1, in which the driving units include abutments on one of the parts extending axially into radially extending slots on the other part, the sides of the abutments and the sides of the slots lying in said planes which are radial or parallel to radial plane, each side of each abutment and that side of the slot which it faces constituting a set of said opposed surfaces with its respective resilient means located therebetween.

12. A driving connection according to claim 11, wherein each slot is longer, in the radial direction than its respective abutment, so that each abutment is free to undergo limited radial movement in its respective slot to adjust for misalignment between the driving and driven parts.

13. A driving connection according to claim 11, said resilient means comprising a single element extending about the abutment to form both the first and the second resilient means.

14. A driving connection according to claim 13, said element being a sleeve of resilient material surrounding its respective abutment.

15. A driving connection according to claim 14, including a spring means urging the resilient material of the second resilient means outward against its adjacent side of the slot.

16. A driving connection according to claim 15, said means for increasing the stiffness of the first resilient means comprising means for increasing the contact area of the resilient material with its side of the abutment as the driving force is increased, the last said means comprising the construction wherein the resilient material has a convex curvature where it abuts the slot, whereby the resilience of the material and the convex shape cause the material to compress so as to increase the said contact area upon an increase in the force transmission in a direction tending to compress that resilient material.

17. A driving connection according to claim 15, in which the spring means is a leaf spring.

18. A driving connection according to claim 15, in which the spring is a coil spring.

19. A driving connection according to claim 13, each slot being longer in the radial direction than its respective abutment so that each abutment is free to undergo limited radial movement in its respective slot to adjust for axial misalignment between the driving and driven parts, and said abutments arranged in at least one pair of groups, wherein the resultant of the torque transmitting forces acting at the abutment-slot connections of the first group of the pair are perpendicular to the direction of the resultant of the other group of the pair.

20. A driving connection according to claim 19, at least one group of the pair comprising two diametrically opposed abutment-slot connections.

21. A driving connection according to claim 20, wherein both groups of each pair comprise two diametrically opposed abutment-slot connections.

22. A driving connection according to claim 19, said driving and driven parts being a combustion engine and a hydraulic torque converter having a rotating casing and also a direct drive connection between the rotating casing and the output of the torque converter.

23. A driving connection according to claim 13, wherein the single element is a sleeve of resilient material formed as an annulus to be deformed by mounting on an abutment on one of the parts, each abutment having two sides, each parallel to and in close proximity to a radial plane passing through the axis of rotation and interconnected by arctate surfaces.

24. A driving connection according to claim 23, wherein the resilient material is secured in position on the abutment by a locking plate.

25. A driving connection according to claim 24, wherein the curvature of the resilient material is such that a mainly radial contact surface is obtained.

26. A resilient driving connection rotatably drivingly connecting a driving part and a driven part, comprising, a plurality of abutments projecting axially from one part into slots on the other part, which slots extend radially a greater distance than their respective abutments so that the abutments are movable radially within their respective slots to adjust for axial misalignment between the axes of the driving and driven parts, resilient means positioned between each side of each abutment and the facing side of the slot, said resilient means on both sides of each abutment engaging their respective sides of the slot in the absence of the force transmission, the resilient means on the side of each abutment which is normally the drive side comprising means for increasing its stiffness as force transmission through the connection increases so as to increase the resonant frequency of that resilient means such that it stays above the actual frequency of the vibrations thereat, and wherein the resilient means on the other side of that abutment has a stiffness less than that of the first said resilient means but sufficient to maintain the abutment and slot into contact during normal driving.

27. A driving connection according to claim 26, said resilient means being a body of resilient material, and including a spring means urging the resilient material on said other side of the abutment outward away from the surface of the abutment and into engagement with its adjacent side of the slot.

* * * * *

UNITED STATES PATENT AND TRADEMARK OFFICE
CERTIFICATE OF CORRECTION

PATENT NO. : 3,940,947
DATED : March 2, 1976
INVENTOR(S) : Karl G. Ahlen

It is certified that error appears in the above-identified patent and that said Letters Patent are hereby corrected as shown below:

Column 7, line 15, please change "second" to --first--.

Signed and Sealed this nineteenth Day of July 1977

[SEAL]

Attest:

RUTH C. MASON
*Attesting Officer*

C. MARSHALL DANN
*Commissioner of Patents and Trademarks*